United States Patent
Wilder et al.

(10) Patent No.: US 9,657,683 B2
(45) Date of Patent: May 23, 2017

(54) PISTON WITH COOLING GALLERY AND CLOSED COLLAR CHAMBER

(71) Applicant: Mahle International GmbH, Stuttgart (DE)

(72) Inventors: Montgomery L. Wilder, Morristown, TN (US); Matthias Seifried, Boesingen (DE); Helmut Edel, Rottweil-Feckenhausen (DE); Reiner Mueller, Rottweil (DE)

(73) Assignee: Mahle International GmbH (DE)

( * ) Notice: Subject to any disclaimer, the term of this patent is extended or adjusted under 35 U.S.C. 154(b) by 468 days.

(21) Appl. No.: 13/928,916

(22) Filed: Jun. 27, 2013

(65) Prior Publication Data
US 2014/0000453 A1    Jan. 2, 2014

Related U.S. Application Data

(60) Provisional application No. 61/665,125, filed on Jun. 27, 2012, provisional application No. 61/665,629, filed on Jun. 28, 2012.

(51) Int. Cl.
*F02F 3/00* (2006.01)
*B23K 20/12* (2006.01)
(Continued)

(52) U.S. Cl.
CPC ............ *F02F 3/0015* (2013.01); *B23K 1/001* (2013.01); *B23K 20/12* (2013.01); *B23K 26/28* (2013.01);
(Continued)

(58) Field of Classification Search
CPC ...... F02F 2003/0061; F02F 3/22; F02F 3/003; F02F 3/16; F02F 3/0015; B23K 26/28;
(Continued)

(56) References Cited

U.S. PATENT DOCUMENTS 8,453,618 B2 *   6/2013   Scharp .................... F02F 3/003
                                                        123/193.6
8,616,114 B2 *   12/2013  Ribeiro ................... F02F 3/003
                                                        29/888.042
(Continued)

FOREIGN PATENT DOCUMENTS

DE     102004019012 A1    11/2005
DE     102004038464 A1    2/2006
(Continued)

OTHER PUBLICATIONS

English abstract for DE-102004038464.
English abstract for DE-102009058176.
English abstract for DE-102004019012.

*Primary Examiner* — Michael Leslie
*Assistant Examiner* — Dustin T Nguyen
(74) *Attorney, Agent, or Firm* — Fishman Stewart PLLC

(57) ABSTRACT

Pistons and methods of making the same are disclosed. An exemplary piston assembly may include a piston crown and skirt. The crown may include a crown collar wall extending downward toward a free end of the crown collar wall. The skirt may include a pair of oppositely disposed pin bosses that each define piston pin bores configured to receive a piston pin for securing a connecting rod between the pin bosses. The skirt may further include a radially inner skirt mating surface abutted along a radially inner interface region with the radially inner crown mating surface, and a radially outer skirt mating surface abutted along a radially outer interface region with the radially outer crown mating surface such that a cooling gallery is substantially enclosed. The skirt may further include an inner collar wall extending upwards to the free end of the crown collar wall.

14 Claims, 5 Drawing Sheets

(51) Int. Cl.
*F02B 11/00* (2006.01)
*F02F 3/22* (2006.01)
*B23K 1/00* (2006.01)
*B23K 26/28* (2014.01)
*B23K 31/00* (2006.01)
*B23K 101/00* (2006.01)
*B23K 103/04* (2006.01)
*B23K 103/06* (2006.01)
*B23K 103/10* (2006.01)

(52) U.S. Cl.
CPC ............ *B23K 31/003* (2013.01); *F02B 11/00* (2013.01); *F02F 3/003* (2013.01); *F02F 3/22* (2013.01); *B23K 2201/003* (2013.01); *B23K 2203/04* (2013.01); *B23K 2203/06* (2013.01); *B23K 2203/10* (2013.01)

(58) Field of Classification Search
CPC ...... B23K 31/003; B23K 1/001; B23K 20/12; B23K 2203/10; B23K 2201/003; B23K 2203/04; B23K 2203/06; F02B 11/00
USPC .................................. 92/172–260; 123/193.6
See application file for complete search history.

(56) References Cited

U.S. PATENT DOCUMENTS

| | | | |
|---|---|---|---|
| 8,973,484 B2* | 3/2015 | Scharp | F02F 3/003 92/186 |
| 2007/0137605 A1* | 6/2007 | Scharp | F02F 3/22 123/193.6 |
| 2008/0229923 A1* | 9/2008 | Gniesmer | F02F 3/22 92/181 R |
| 2009/0151555 A1* | 6/2009 | Lapp | F02F 3/003 92/172 |
| 2010/0108015 A1* | 5/2010 | Scharp | F02F 3/22 123/193.6 |
| 2010/0275873 A1* | 11/2010 | Gniesmer | B23K 20/129 123/193.6 |
| 2011/0132971 A1* | 6/2011 | Kolbe | B23K 20/129 228/114 |
| 2011/0197845 A1* | 8/2011 | Flowers | F02F 3/003 123/193.6 |

FOREIGN PATENT DOCUMENTS

| | | |
|---|---|---|
| DE | 102009058176 A1 | 1/2011 |
| WO | WO-2013/004364 A1 | 1/2013 |

\* cited by examiner

PISTON WITH COOLING GALLERY AND CLOSED COLLAR CHAMBER

CROSS-REFERENCE TO RELATED APPLICATIONS

This application claims priority to U.S. Provisional Application Ser. No. 61/665,125, filed on Jun. 27, 2012, and to U.S. Provisional Application Ser. No. 61/665,629, filed on Jun. 28, 2012, and the contents of each are hereby expressly incorporated by reference in their entireties.

BACKGROUND

A power cylinder assembly of an internal combustion engine generally comprises a reciprocating piston disposed within a cylindrical cavity of an engine block. One end of the cylindrical cavity may be closed while another end of the cylindrical cavity may be open. The closed end of the cylindrical cavity and an upper portion or crown of the piston defines a combustion chamber. The open end of the cylindrical cavity permits oscillatory movement of a connecting rod, which joins a lower portion of the piston to a crankshaft, which is partially submersed in an oil sump. The crankshaft converts linear motion of the piston (resulting from combustion of fuel in the combustion chamber) into rotational motion.

Engines, and in particular the pistons, are under increased stress as a result of constant efforts to increase overall efficiency, e.g., by reducing piston weight and/or increasing pressures and temperatures associated with engine operation. Piston cooling is therefore increasingly important for withstanding the increased stress of such operational conditions over the life of the engine. To reduce the operating temperatures of piston components, a cooling gallery may be provided about a perimeter of the piston, into which crankcase oil may be introduced to reduce the operating temperature of the piston.

Known piston designs having peripheral cooling galleries typically also have centrally disposed galleries and allow for coolant fluid communication directly between the peripheral and central galleries. Such central galleries may be complex or expensive to form in the piston components.

Accordingly, there is a need for a robust, lightweight piston design that reduces frictional losses associated with movement of the piston within the engine bore and also allows adequate cooling, such as by providing a cooling gallery, while simplifying construction of the piston.

BRIEF DESCRIPTION OF THE DRAWINGS

Referring now to the drawings, exemplary illustrations are shown in detail. Although the drawings represent representative examples, the drawings are not necessarily to scale and certain features may be exaggerated to better illustrate and explain an innovative aspect of an illustrative example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Various exemplary illustrations are provided herein of pistons and methods of making the same. An exemplary piston assembly may include a piston crown and skirt. The crown may include radially inner and outer crown mating surfaces, and the crown may define at least in part a cooling gallery extending about a periphery of the crown. The crown may further include a crown collar wall extending downward toward a free end of the crown collar wall. The skirt may include a pair of oppositely disposed pin bosses that each define piston pin bores configured to receive a piston pin for securing a connecting rod between the pin bosses. The skirt may further include a radially inner skirt mating surface abutted along a radially inner interface region with the radially inner crown mating surface, and a radially outer skirt mating surface abutted along a radially outer interface region with the radially outer crown mating surface such that the cooling gallery is substantially enclosed. The skirt may further include an inner collar wall disposed radially inwardly of the radially inner interface region and extending upwards to the free end of the crown collar wall.

An exemplary method of forming a piston may include providing a piston crown including radially inner and outer crown mating surfaces, the crown defining at least in part a cooling gallery extending about a periphery of the crown. The method may further include abutting the inner and outer crown mating surfaces with corresponding inner and outer skirt mating surfaces of a piston skirt. Accordingly, a radially inner interface region is formed between the inner mating surfaces, and a radially outer interface region is formed between the outer mating surfaces. Moreover, a cooling gallery may be disposed between the radially inner and outer interface regions. The skirt may include a pair of oppositely disposed pin bosses defining piston pin bores that are configured to receive a piston pin securing a connecting rod between the pin bosses. The method may further include forming a crown collar wall extending downward from the crown to a crown collar end, and providing a skirt collar wall that extends upwards to the free end of the crown collar wall.

Figure 1:
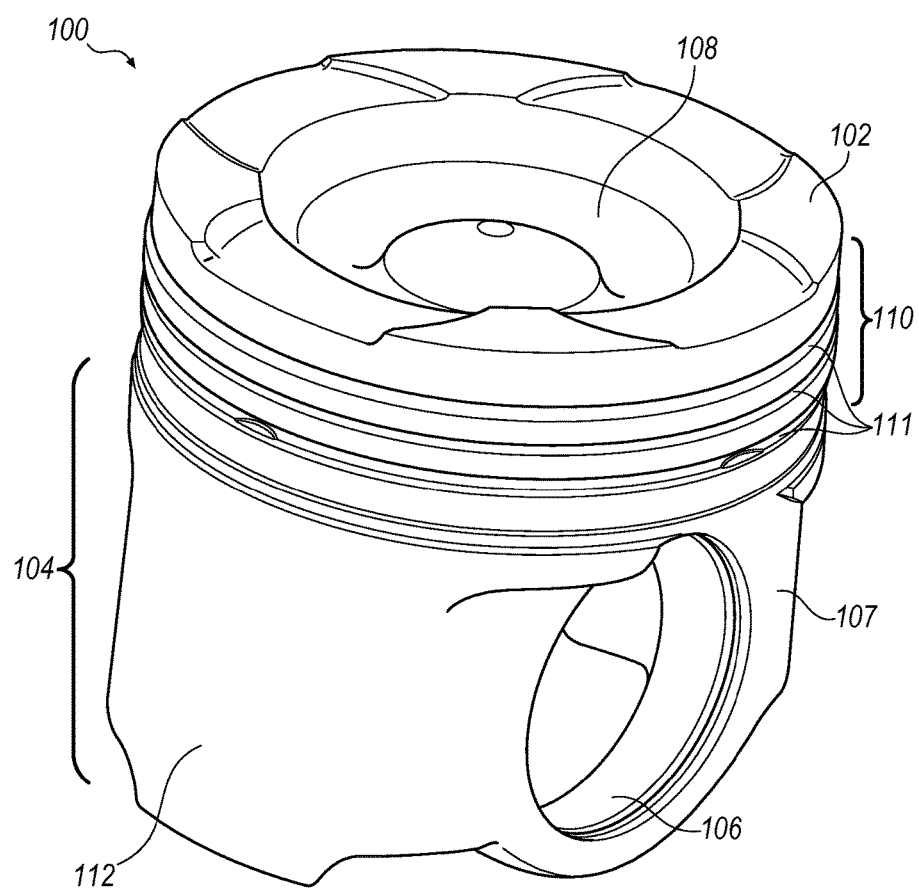
FIG. 1 is a perspective view of an exemplary piston assembly.

Turning now to FIG. 1, an exemplary piston assembly 100 is illustrated. Piston assembly 100 may include a piston crown 102 and a piston skirt 104. The piston crown 102 may include a combustion bowl 108 and a ring belt portion 110 that is configured to seal against an engine bore (not shown) receiving the piston assembly 100. For example, the ring belt portion 110 may define one or more circumferential grooves 111 that receive piston rings (not shown), which in turn seal against engine bore surfaces during reciprocal motion of the piston assembly 100 within the engine bore.

The piston skirt 104 generally supports the crown 102 during engine operation, e.g., by interfacing with surfaces of an engine bore (not shown) to stabilize the piston assembly 100 during reciprocal motion within the bore. For example, the skirt 104 may have an outer surface 112 that generally defines a circular outer shape about at least a portion of a perimeter of the piston assembly 100. The outer shape may correspond to the engine bore surfaces, which may be generally cylindrical. The outer surface 112 of the skirt 104 may generally slide along the bore surfaces as the piston moves reciprocally within the bore.

The skirt 104 may also include piston pin bosses 107. The piston pin bosses 107 may generally be formed with apertures 106 configured to receive a piston pin (not shown). For example, a piston pin may be inserted through the apertures in the piston pin bosses 107, thereby generally securing the skirt 104 to a connecting rod (not shown). The pin bosses 107 generally define an open area 170 between the pin bosses 107, e.g., for receiving the connecting rod (not shown).

Figure 2:
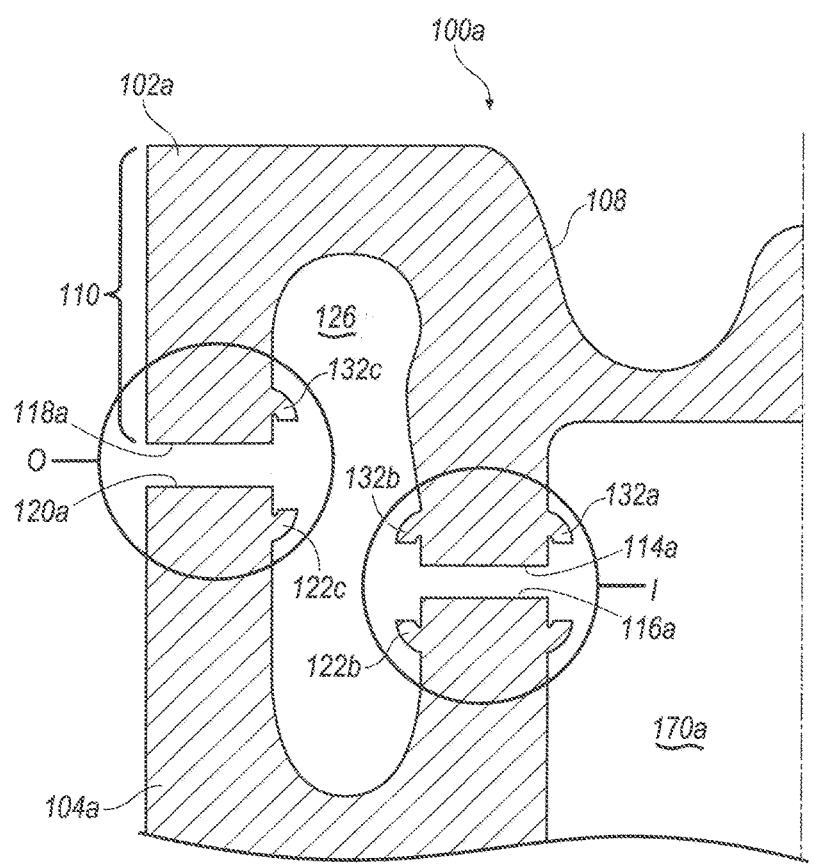
FIG. 2 illustrates a sectional view of exemplary radially inner and outer interface regions of a piston assembly according to one exemplary illustration, where a crown portion is separated from a skirt portion.

Turning now to FIG. 2, an exemplary piston 100a is illustrated in further detail. The crown 102a and skirt 104a of the piston assembly 100a may be secured to each other in any manner that is convenient. For example, the crown 102a may define radially outer and inner mating surfaces 118a, 114a that are abutted with corresponding radially outer and inner mating surfaces 120a, 116a of the skirt 104a. The mating surfaces 114, 116, 118, 120 may each extend about at least a portion of a circumference of the crown 102 and skirt 104, respectively. In the exemplary illustration of FIG. 2, the radially outer and inner crown mating surfaces 118a, 114a, respectively, may generally extend substantially about an entire periphery of the crown 102a. Similarly, the radially outer and inner skirt mating surfaces 120a, 116a also may extend about substantially the entire periphery of the piston assembly 100 and/or skirt 104a, and generally correspond to the crown mating surfaces 118a, 114a as will be described further below.

The crown and skirt mating surfaces 114, 116, 118, and 120 may cooperate to define a radially inner interface region I between the radially inner mating surfaces 114a, 116a, and a radially outer interface region O between the radially outer mating surfaces 118a, 120a. Where the crown 102a and skirt 104a are fixedly secured, the crown 102a and skirt 104a may be secured to each other via one or both of the interface regions I, O.

A circumferentially extending cooling gallery 126a may be defined in part by the ring belt portion 110 of the crown 102a and the skirt 104a. For example, the exemplary illustration of FIG. 2 includes a cooling gallery 126a that generally extends about a perimeter of the piston crown 102a, and may circulate a coolant during operation, e.g., engine oil, thereby reducing an operating temperature of the piston. Additionally, the circulation of the coolant may facilitate the maintaining of a more stable or uniform temperature about a piston assembly 100, and especially in the upper portion of the piston assembly 100, e.g., the crown 102 and combustion bowl 108.

A piston crown 102 and skirt 104 may generally cooperate to define the cooling gallery 126 between the radially inner interface region I and the radially outer interface region O. For example, as shown in FIG. 2 the skirt 104a may form a lower boundary of the cooling gallery 126a, thereby enclosing the cooling gallery 126a within the crown 102a, and preventing coolant from freely entering and escaping the cooling gallery 126a. At the same time, one or more apertures (not shown) may also be provided to allow oil or other coolants to exit and enter the cooling gallery 126a to/from the engine (not shown) in a controlled manner, thereby further reducing and/or stabilizing operating temperatures associated with the piston 100a and components thereof.

The crown mating surfaces 114a, 118a may generally define flat or planar circumferentially extending surfaces that align with the corresponding radially inner and outer mating surfaces 116a, 120a of the piston skirt 104a. As will be described further below, the skirt mating surfaces 116a, 120a and crown mating surfaces 114a, 118a may each be aligned generally parallel to the corresponding mating surface on the other component, thereby facilitating abutment of the crown mating surfaces 114a, 118a with the skirt mating surfaces 116a, 120a, respectively.

The piston crown 102 and the piston skirt 104 may be secured or fixedly joined to one another in any manner that is convenient including, but not limited to, welding methodologies such as friction welding, beam welding, laser welding, soldering, or non-welding methodologies such as adhesive bonding, merely as examples. In one example, the piston crown and skirt are joined in a welding process, e.g., friction welding. In another exemplary illustration, one or both crown mating surfaces 114a, 118a may be secured to their respective skirt mating surface 116a, 120a in any manner that is convenient, e.g., by way of a welding operation such as friction welding or adhesive bonding, merely as examples, thereby securing the crown 102 and skirt 104 together.

The radially outer mating surfaces 118a, 120a of the crown 102 and skirt 104, respectively, may be in abutment due to the securement of the radially inner mating surfaces 114a, 116a, and need not be fixedly secured. Alternatively, the radially outer mating surfaces 118a, 120a may be fixedly secured, e.g., by welding, bonding, or any other manner that is convenient. Fixed securement of both pairs of the radially outer and inner mating surfaces 114, 116, 118, 120 may be desirable, for example, for particularly heavy-duty piston applications where maximum durability is desired.

By fixedly joining the piston crown 102 and the piston skirt 104, a piston assembly 100 may generally be formed as a one-piece or "monobloc" assembly where the crown 102 and skirt 104 components are joined at interface regions I, O that include the radially inner mating surfaces 114, 116 and radially outer mating surfaces 118, 120, respectively. That is, the piston crown 102 is generally unitized with the piston skirt 104, such that the piston skirt 104 is immovable relative to the piston crown 102 after securement to the crown, although the crown 102 and skirt 104 are separate components.

The piston crown 102 and piston skirt 104 may be constructed from any materials that are convenient. In one exemplary illustration, the crown 102 and skirt 104 are formed of the same material, e.g., steel. In another example, the piston crown 102 may be formed of a different material than the piston skirt 104. Accordingly, a material used for the piston crown 102 may include different mechanical properties than the piston skirt 104, e.g., yield point, tensile strength, notch toughness, or thermal conductivity, merely as examples. Any material or combination may be employed for the crown 102 and skirt 104 that is convenient. Merely as examples, the crown 102 and/or skirt 104 may be formed of a steel material, cast iron, aluminum material, composite, or powdered metal material. The crown 102 and skirt 104 may also be formed in different processes, e.g., the crown 102 may be a generally single cast piece, while the skirt 104 may be forged. Any material and/or forming combination may be employed that is convenient.

In examples where the crown 102 and skirt 104 are welded together, e.g., by friction welding, one or more weld flashings (not shown in FIG. 2) may be formed between the crown 102 and skirt 104. For example, weld flashings may be formed that extend radially outwardly and inwardly, respectively, from the radially inner interface region I. Additionally, weld flashing may be formed that extends radially inwardly from the radially outer interface region O. Another weld flashing that extends radially outwardly from the radially outer interface region may generally be a further byproduct of a friction welding operation along the radially outer interface region O, and may be removed to form the relatively smooth outer surface of the piston assembly 100. For example, weld flashing may be removed via a machining operation.

Figure 3:
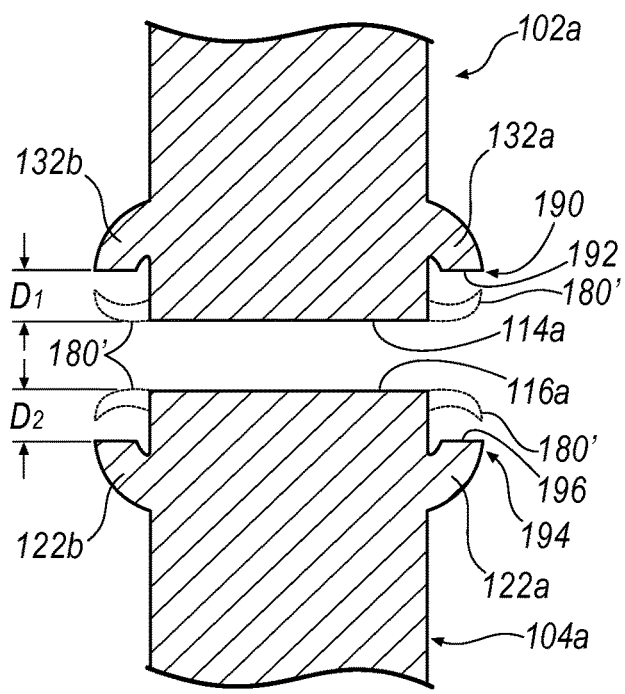
FIG. 3 illustrates a sectional view of an exemplary interface region of the piston assembly from FIG. 2, prior to joining the crown portion with the skirt portion.
Figure 4:
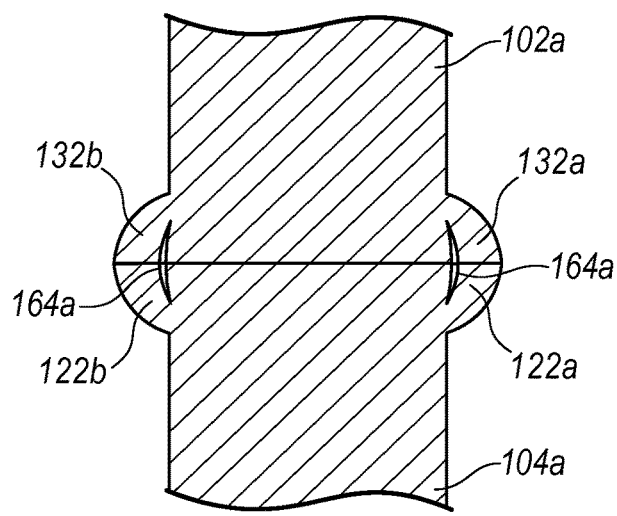
FIG. 4 illustrates a sectional view of the interface region of the piston assembly from FIGS. 2 and 3, after joining the crown portion with the skirt portion.

In the exemplary illustration shown in FIGS. 2-4, weld flashing may generally be contained within a pair of collar walls adjacent an interface region. For example, the crown 102a and skirt 104a may each include one or more generally circumferentially extending walls or collars about any of the interface regions defined between the crown 102a and skirt 104a. More specifically, as best seen in FIG. 2 a first pair of crown and skirt collar walls 132a, 122a, respectively, may be positioned radially inwardly of the radially inner interface region I. The crown collar 132a and skirt collar 122a may cooperate to generally obstruct or block off the radially inner interface region I and/or radially inwardly extending weld flashing (not shown in FIG. 2) from a central area 170a of the piston between pin bosses of the skirt. The crown collar 132a and skirt collar 122a thereby generally cooperate to enclose the radially inner interface region I. Moreover, the crown collar 132a and skirt collar 122a may generally prevent weld flashing from forming disruptions in the surfaces extending between the crown 102a and skirt 104a along the interface regions, as will be described further below. Accordingly, surfaces of the collar walls 132, 122 are generally smooth after completion of the welding process and may offer little if any surface disruption from any weld flashing or other byproduct of a friction welding operation.

An exemplary piston 100 may have additional collar walls. For example, as best seen in FIG. 2 a second pair of crown and skirt collar walls 132b, 122b may be provided adjacent the radially inner crown and skirt mating surfaces 114a, 116a on a radially outer side, such that the crown and skirt collar walls 132b, 122b are disposed within the cooling gallery 126a formed by the crown 102a and skirt 104a. Additionally, a third pair of crown and skirt collar walls 132c, 122c may be provided adjacent the radially outer crown and skirt mating surfaces 118a, 120a on a radially inner side thereof such that the crown and skirt collar walls 132c, 122c are disposed within the cooling gallery 126a.

The skirt collar walls 122a, 122b, 122c (collectively, 122) may generally extend upward from the skirt 104. The skirt collar walls 122, as best seen in FIG. 2, may each extend upward adjacent the corresponding mating surfaces to a free end 190 defining an abutment surface 192. Moreover, the crown collar 132 may extend downward from the crown 102 to a free end 194 defining an opposing abutment surface 196.

The free ends 190, 194 of the collars 132, 122 may be abutted or fitted against one another along the abutment surfaces 192, 196, thereby enclosing the mating surfaces adjacent the collar walls 132, 122. As best seen in FIG. 3, the collar walls 132, 122 may generally cooperate to enclose weld flashings 180' (shown in phantom in FIG. 3) that would otherwise extend further away from the adjacent mating surfaces. Weld flashings 180' may propagate in response to a friction welding operation associated with the adjacent mating surfaces, e.g., mating surfaces 114a, 116a as shown in FIG. 3. The collar walls 132, 122 may contain the weld flashings 180' extending radially inwardly from the adjacent interface region, e.g., radially inner interface region I. More specifically, as best seen in FIG. 4, which is an illustration of the crown 102a and skirt 104a after being friction welded together, any weld flashings are contained within the crown collar walls 132a, 132b and skirt collar walls 122a, 122b. The abutment surfaces 192, 196 may extend substantially perpendicular to a longitudinal axis A-A of the piston (not shown in FIG. 2). In another exemplary illustration, the abutment surfaces extend 192, 196 substantially parallel to the associated crown and skirt mating surfaces 114, 116.

The abutment surfaces 192, 196 may generally be abutted against one another to enclose any weld flashings generated in a friction welding operation associated with the crown and skirt mating surfaces 114a, 116a, as best seen in FIG. 4. The crown and skirt collar walls 132, 122 may thus generally enclose the weld flashings. Moreover, the crown and skirt collar walls 132, 122 may define relatively small annular chambers 164a or galleries about weld flashings which restrict the weld flashing, and in some cases limit propagation of the weld flashings and confine the weld flashings within the chamber/gallery formed by the crown and skirt collar walls 132, 122. Thus, the appearance of the joined mating surfaces after a friction welding operation may be, as best seen in FIG. 4, that the crown and skirt collar walls 132, 122 extend about and enclose the associated crown and skirt mating surfaces 114, 116. Thus, weld flashing may generally "fill" the chamber 164a formed by the crown and skirt mating surface. By comparison, typical weld flashings as generally formed when not restricted in such a manner may generally tend to propagate beyond the limits defined by the collar walls 132, 122, e.g., similar to weld flashing 180' that is shown in phantom in FIG. 3.

As best seen in FIG. 2, the opposing abutment surfaces 192, 196 of the crown and skirt collar walls 132, 122 may define a predetermined axial distance $D_1$, $D_2$ spacing them away axially with respect to their associated crown and skirt mating surfaces 114, 116. The axial distances $D_1$, $D_2$ may each correspond to approximately one-half of an upset length associated with a friction welding operation associated with the joining of the crown and skirt mating surfaces 114, 116. Thus, the abutment surfaces 192, 196 may be drawn into contact upon completion of the friction welding operation. Moreover, the axial spacing of the abutment surfaces 192, 196 from their respective mating surfaces 192, 196 may also prevent unnecessarily elevated abutment forces from propagating between the opposing abutment surfaces 192, 196. The abutment surfaces 192, 196 may thus be generally flush against one another, and may be abutted with a sufficient force to prevent intrusion of foreign elements, e.g., liquids, contaminants, etc., while not interfering with the friction welding operation between the crown and skirt mating surfaces.

The abutment between the crown collar and skirt collars 132, 122 may in some exemplary approaches be sufficient to prevent fluid intrusion into the collar gallery 164a. For example, the free ends 190, 194 of the crown collar and skirt collar 132a, 122a may be abutted together with a predetermined force sufficient to restrict or prevent entirely intrusion of fluid into the collar gallery 164a, e.g., engine oil or coolant. Moreover, the closed collar gallery 164a also resists intrusion of any dirt or debris, e.g., chips, that might interfere with a weld joint between the radially inner mating surfaces 114, 116 of the crown 102 and skirt 104.

Figure 5A:
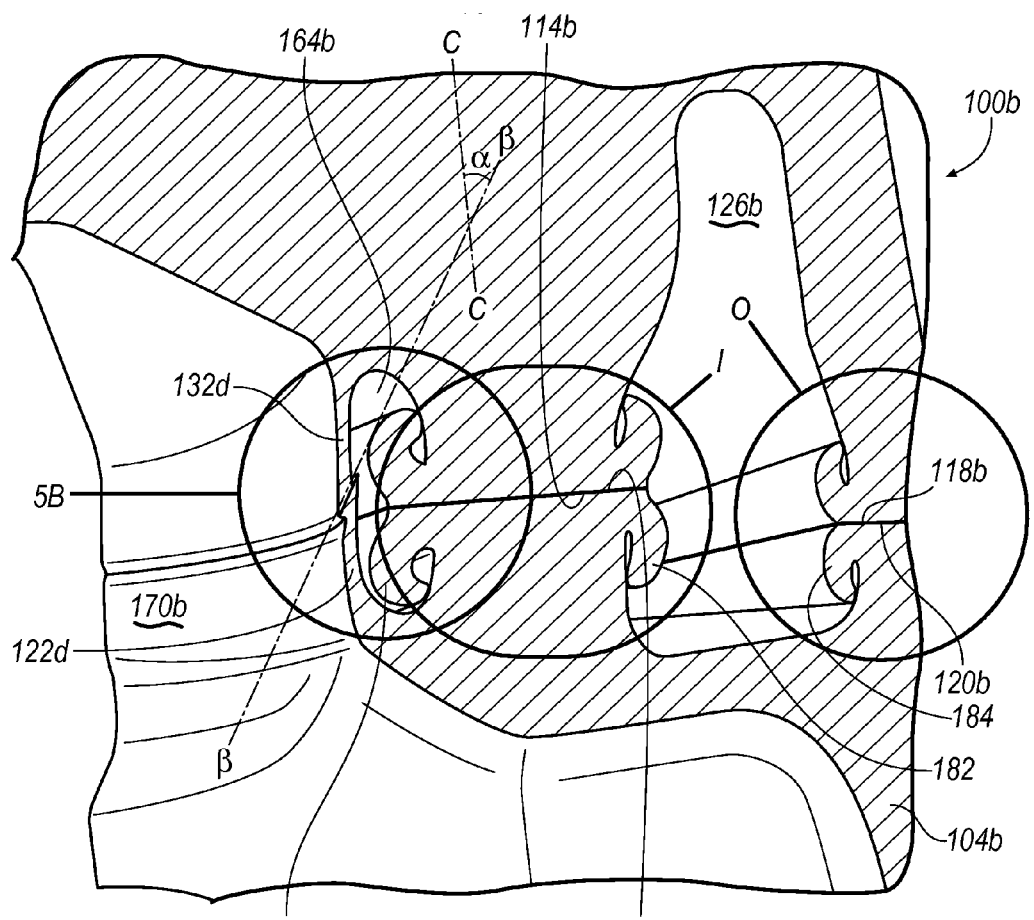
FIG. 5A illustrates a sectional view of radially inner and outer interface regions of a piston assembly, according to another exemplary illustration, with a crown portion joined with a skirt portion.
Figure 5B:
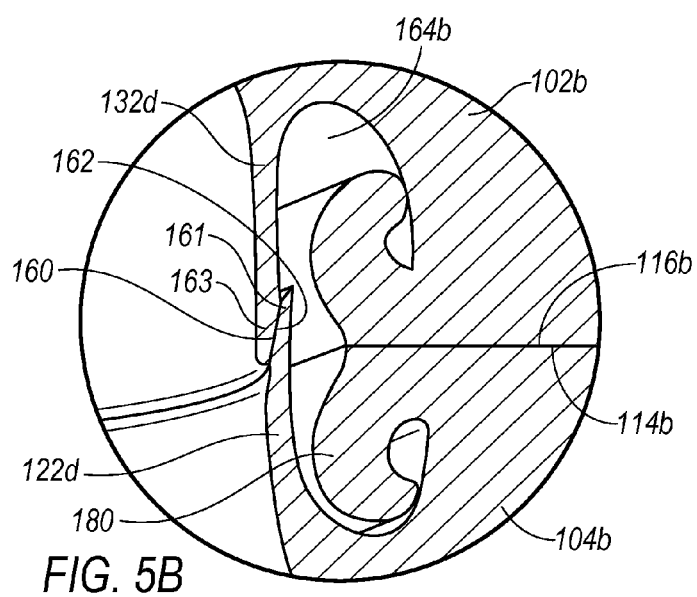
FIG. 5B illustrates an enlarged view of detail 5B of FIG. 5A.

Turning now to FIGS. 5A and 5B, in another exemplary illustration of a piston 100b, a crown 102b and skirt 104b may each include a generally circumferentially extending wall or inner "collar." More specifically, the crown 102b may include a crown collar 132d while the skirt 104b includes a skirt collar 122d. The collars 122d, 132d may each be positioned radially inwardly of the radially inner interface region I. The crown collar 132d and skirt collar 122d may cooperate to generally obstruct or block off the radially inner interface region I and/or radially inwardly extending weld flashing 180 from a central area 170b of the piston 100. The crown collar 132d and skirt collar 122d thereby may cooperate to generally enclose the radially inner interface region I and/or weld flashing 180, forming an annular collar chamber or gallery 164b.

The skirt collar 122d may extend generally upward from the skirt 104b. The skirt collar 122d extends upward adjacent the radially inner weld flashing 180 to a free end 161. Moreover, the crown collar 132d extends downward from the crown 102 to a free end 163. The free ends 161, 163 of the collars may be abutted or fitted against one another, thereby enclosing the weld flashings extending radially inwardly from the radially inner interface region I. Moreover, the abutment between the crown collar 132d and skirt collar 122d may be sufficient to prevent fluid intrusion into the collar gallery 164b. In one example, the free ends 161, 163 of the crown and skirt collars 132d, 122d are abutted together with a predetermined force sufficient to sustain a pressure of 2 bars within the collar gallery 164b. Accordingly, intrusion of any fluid into the collar gallery 164b, e.g., engine oil or coolant, is substantially inhibited, if not prevented entirely. Moreover, the closed collar gallery 164b also prevents intrusion of any dirt or debris, e.g., chips, that might interfere with a weld joint between the radially inner mating surfaces 114b, 116b of the crown 102 and skirt 104.

As best seen in FIG. 5B, the free ends 161, 163 of the collars 132d, 122d may each define angled end surfaces 160, 162 that are abutted or mated against one another. For example, as the crown 102b and skirt 104b are welded together, the angled end surfaces 160, 162 may be aligned generally or substantially parallel to one another, facilitating a sliding engagement as the crown 102 and skirt 104 are welded together and the collars 132d, 122d come into contact with one another. As the crown 102 and skirt 104 are welded together, e.g., by friction welding, an abutment force between the angled end surfaces 160, 162 increases in a generally controlled manner, e.g., in a linear fashion, as a result of the alignment of the angled end surfaces 160, 162. The relatively controlled increase in abutment force may thereby minimize any interference, e.g., due to lateral forces imparted from the skirt collar 122d to the crown collar 134d, or vice versa, with the welding of the crown 102b and skirt 104b together. The angle α defined by the angled end surfaces 160, 162 of the collars, e.g., as measured relative to a vertical line C-C that is parallel to longitudinal axis A-A (not shown in FIGS. 5A and 5B) of the piston 100, may be defined in such a manner to allow a generally controlled and consistent engagement between the crown and skirt collars. In one exemplary illustration, the angle α is an oblique angle with the longitudinal axis A-A of the piston 100. In another example, one or both angled end surfaces 160, 162 form an acute angle with the longitudinal axis of the piston 100.

Figure 6:
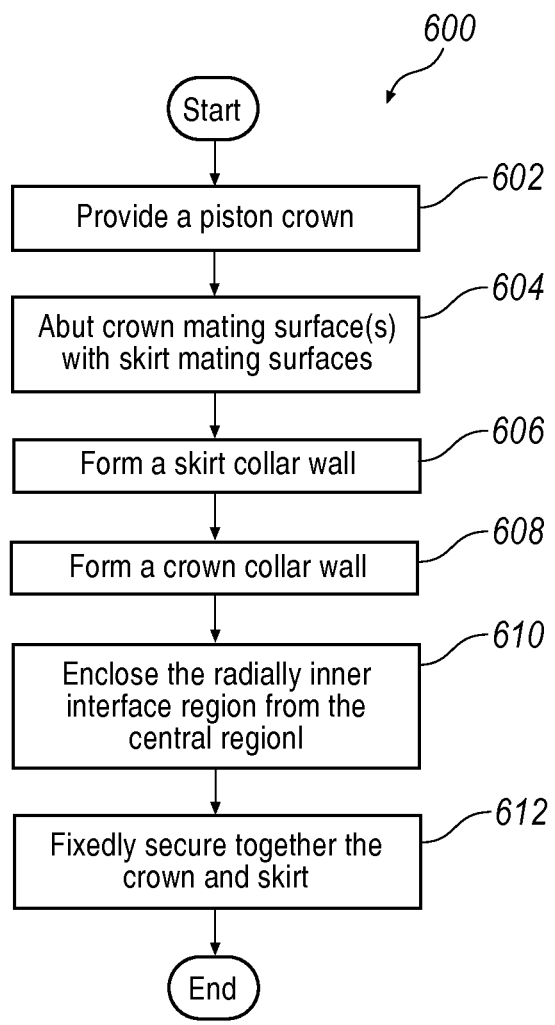
FIG. 6 is a process flow diagram of an exemplary method of making a piston assembly.

Turning now to FIG. 6, an exemplary process 600 for making a piston assembly is illustrated. Process 600 may generally begin at block 602, where a piston crown is provided. For example, as described above a crown 102 may include radially inner and outer crown mating surfaces 114, 116. Additionally, the crown 102 may define at least in part a cooling gallery 126 extending about a periphery of the crown 102. Process 600 may then proceed to block 604.

At block 604, inner and outer crown mating surfaces may be abutted with corresponding inner and outer skirt mating surfaces of a piston skirt. For example, as described above a radially inner interface region I may be formed between the inner mating surfaces 116, 120, and a radially outer interface region O may be formed between outer mating surfaces 114, 118 of the piston assembly 100. Moreover, a cooling gallery 126 may be disposed between the radially inner and outer interface regions I, O. Additionally, the skirt 104 may include a pair of oppositely disposed pin bosses 107 defining respective piston pin bores 106. The pin bosses may cooperate to define a generally open central region 170 configured to receive a connecting rod between the pin bosses 107.

Proceeding to block 606, a skirt collar wall may be formed. For example, as described above, various exemplary illustrations of a skirt collar wall 122 may be disposed radially inwardly of the radially inner interface region I, extending upward from the skirt 104 to a free end. Process 600 may then proceed to block 608.

At block 608, a crown collar wall may be formed. For example, as described above, exemplary crown collar walls 132 may be provided that extend axially downwar to a free end that may be used to contact or abut the skirt collar wall 122, thereby closing off an interface region and/or weld flashing.

Proceeding to block 610, a radially inner interface region may be generally enclosed from the central region with the crown and skirt collar walls. For example, as described above, a radially inner interface region I may be enclosed by the collar walls 132, 122 with respect to an open central region 170 defined between the pin bosses 107.

In some exemplary approaches, a pair of mating surfaces and/or an interface region of a crown 102 and skirt 104 may be enclosed by collars that generally restrict propagation of weld flashing from a friction welding operation associated with the mating surfaces. For example, as described above in FIG. 2 a piston crown 102a may have a crown collar wall 132 that cooperates with a skirt collar wall 122 to generally restrict propagation of weld flashing from the mating surfaces 114, 116a. A collar chamber 164a defined by the collar walls 132, 122 may thus be substantially filled by weld material as a result of a friction welding operation. In other approaches, e.g., as described above in FIGS. 5A and 5B, collar walls 132d, 122d may define a somewhat larger enclosed collar chamber 164b that permits weld flashing 180 to form within the chamber 164. Nevertheless, the collar walls 132d, 122d generally define a closed chamber 164 that prevents ingress of contaminants, lubricants, coolants, or the like during operation.

In some examples, e.g., as described above in FIGS. 2-4, collar walls 132, 122 may define abutment surfaces that are substantially perpendicular to a piston axis A-A of the piston 100. During a friction welding operation associated with adjacent mating surfaces, the abutment surfaces 192, 196 may generally be urged into abutting contact. Moreover, the abutment surfaces 192, 196 may define an axial spacing away from their associated mating surfaces, as described above, thereby facilitating abutting contact between the abutment surfaces that provides a generally enclosed chamber 164 while not resulting in excessive loads that interfere with the friction welding operation.

As described above, in some exemplary illustrations free ends 161, 163 of the collars 132*d*, 122*d* may each define angled end surfaces 160, 162 that are abutted or mated against one another. The angled end surfaces 160, 162 may be aligned generally or substantially parallel to one another, facilitating a sliding engagement as the crown 102 and skirt 104 are welded together and the collars 132*d*, 122*d* come into contact with one another. As the crown 102 and skirt 104 are welded together, e.g., by friction welding, an abutment force between the angled end surfaces 160, 162 increases in a generally controlled manner as the collar walls 132*d*, 122*d* come into initial contact and then are displaced axially relative to each other. Accordingly, the angled surfaces 160, 162, facilitate a relatively controlled increase in abutment force during an associated welding operation, thereby minimizing interference, e.g., due to lateral forces imparted from the skirt collar 122*d* to the crown collar 134*d*, or vice versa, with the welding of the crown 102*b* and skirt 104*b* together. The angled end surfaces 160, 162 may each define a generally same angle α with respect to the piston axis A-A. Process 600 may then proceed to block 612.

At block 612, the crown and skirt may be fixedly secured together along one or more of the radially inner and outer interface regions. For example, as described above the crown and skirt may be fixedly secured together along the radially inner and/or outer mating surfaces of the crown and skirt by friction welding, adhesive bonding, or any other method that is convenient. In examples where friction welding is employed, welding flash may be formed adjacent the mating surfaces 114, 116, 118, 120, as illustrated above. In one exemplary illustration, a weld flash 180 extending radially inwardly from the radially inner interface region I is generally enclosed withing a collar chamber 164.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. It is anticipated and intended that future developments will occur in the arts discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A piston, comprising:
    a piston crown including radially inner and outer crown mating surfaces, the crown defining at least in part a cooling gallery extending about a periphery of the crown, the crown including a crown collar wall extending downward to a free end; and
    a piston skirt, including:
        a pair of oppositely disposed pin bosses, the pin bosses each defining piston pin bores and cooperating to define a generally open central region configured to receive a connecting rod between the pin bosses;
        a radially inner skirt mating surface abutted along a radially inner interface region with the radially inner crown mating surface;
        a radially outer skirt mating surface abutted along a radially outer interface region with the radially outer crown mating surface such that the cooling gallery is substantially enclosed; and
        a skirt collar wall disposed radially inwardly of the radially inner interface region and extending upwards to the free end of the crown collar wall;
    wherein the crown collar wall cooperates with the skirt collar wall and the radially inner interface region to enclose an annular gallery to prevent fluid intrusion into the annular gallery; and
    wherein a weld flashing extending from an associated pair of crown and skirt mating surfaces adjacent the crown and skirt collar walls is contained within the annular gallery;
    wherein the crown collar wall cooperates with the skirt collar wall by overlapping one another in an unwelded joint to enclose the radially inner interface region formed between the radially inner skirt mating surface and the radially inner crown mating surface;
    wherein at least one of the crown collar wall and the skirt collar wall defines an angled end surface, the angled end surface oriented at an oblique angle with respect to a longitudinal axis of the piston.

2. The piston of claim 1, wherein the crown collar wall defines an upper angled end surface, and the skirt collar wall defines a lower angled end surface, the upper angled end surface oriented substantially parallel to the lower angled end surface.

3. The piston of claim 1, wherein the crown collar wall is laterally aligned with the skirt collar wall.

4. The piston of claim 1, wherein the crown and skirt are friction welded together along at least one of the radially inner and outer mating surfaces of the crown and skirt.

5. The piston of claim 1, wherein the crown collar wall and skirt collar wall define opposing surfaces extending substantially perpendicular to a longitudinal axis of the piston.

6. The piston of claim 5, wherein the opposing surfaces are oriented substantially parallel to at least one mated pair of the crown and skirt mating surfaces.

7. The piston of claim 1, wherein the opposing surfaces of the crown collar wall and the skirt collar wall each define an axial distance from an associated crown mating surface and an associated skirt mating surface, respectively; and
    wherein the axial distance is approximately equal to one half of an upset length associated with the associated crown and skirt mating surfaces.

8. A piston, comprising:

a piston crown including radially inner and outer crown mating surfaces, the crown defining at least in part a cooling gallery extending about a periphery of the crown, the crown including a crown collar wall extending downward to a crown collar end; and a piston skirt, including:

a pair of oppositely disposed pin bosses configured to receive a connecting rod between the pin bosses;

a radially inner skirt mating surface abutted along a radially inner interface region with the radially inner crown mating surface;

a radially outer skirt mating surface abutted along a radially outer interface region with the radially outer crown mating surface such that the cooling gallery is substantially enclosed; and a skirt collar wall disposed adjacent one of the radially inner and radially outer interface regions and extending upwards to the free end of the crown collar wall;

wherein the crown collar wall cooperates with the skirt collar wall and the radially inner interface region to enclose an annular gallery to prevent fluid intrusion into the annular gallery; and wherein a weld flashing extending from an associated pair of crown and skirt mating surfaces adjacent the crown and skirt collar walls is contained within the annular gallery;

wherein the crown collar wall cooperates with the skirt collar wall by overlapping one another in an unfused joint to enclose the radially inner interface region formed between the radially inner skirt mating surface and the radially inner crown mating surface;

wherein at least one of the crown collar wall and the skirt collar wall defines an angled end surface, the angled end surface oriented at an oblique angle with respect to a longitudinal axis of the piston.

9. The piston of claim 8, wherein the skirt collar wall is disposed radially inwardly of the radially inner interface region.

10. A method, comprising:

providing a piston crown including radially inner and outer crown mating surfaces, the crown defining at least in part a cooling gallery extending about a periphery of the crown;

abutting the inner and outer crown mating surface with corresponding inner and outer skirt mating surfaces of a piston skirt to form a radially inner interface region between the inner mating surfaces, a radially outer interface region between the outer mating surfaces, and a cooling gallery disposed between the radially inner and outer interface regions, the skirt including a pair of oppositely disposed pin bosses defining piston pin bores and cooperating to define a generally open central region configured to receive a connecting rod between the pin bosses;

forming a crown collar wall extending downward from the crown to a crown collar end;

providing a skirt collar wall disposed radially inwardly of the radially inner interface region and extending upwards to the free end of the crown collar wall, wherein the crown collar wall cooperates with the skirt collar wall and the radially inner interface region to enclose an annular gallery to prevent fluid intrusion into the annular gallery, and a weld flashing extending from an associated pair of crown and skirt mating surfaces adjacent the crown and skirt collar walls is contained within the annular gallery; and defining wherein at least one of the crown collar wall and the skirt collar wall defines an angled end surface wherein the crown collar wall cooperates with the skirt collar wall by overlapping one another in an unbonded joint to enclose the radially inner interface region formed between the radially inner skirt mating surface and the radially inner crown mating surface.

11. The method of claim 10, further comprising enclosing the radially inner interface region from the central region with the inner collar wall.

12. The method of claim 10, further comprising defining opposing surfaces of the crown and skirt collar walls, the opposing surfaces extending substantially perpendicular to a longitudinal axis of the piston.

13. The method of claim 10, further comprising defining an axial distance from the opposing surfaces of the crown collar wall and the skirt collar wall to an associated crown mating surface and an associated skirt mating surface, respectively; and establishing the axial distance as approximately equal to one half of an upset length associated with the associated crown and skirt mating surfaces.

14. The method of claim 10, further comprising friction welding the radially inner and outer crown mating surfaces to the radially inner and outer skirt mating surfaces, respectively.

* * * * *